(12) United States Patent
Ono et al.

(10) Patent No.: US 11,441,748 B2
(45) Date of Patent: Sep. 13, 2022

(54) LIGHTING DEVICE

(71) Applicant: Nippon Telegraph and Telephone Corporation, Tokyo (JP)

(72) Inventors: Yoko Ono, Musashino (JP); Hironobu Minowa, Musashino (JP); Shuhei Sakamoto, Musashino (JP); Takeshi Komatsu, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 0 days.

(21) Appl. No.: 17/288,195

(22) PCT Filed: Nov. 6, 2019

(86) PCT No.: PCT/JP2019/043346
§ 371 (c)(1),
(2) Date: Apr. 23, 2021

(87) PCT Pub. No.: WO2020/105420
PCT Pub. Date: May 28, 2020

(65) Prior Publication Data
US 2021/0396366 A1 Dec. 23, 2021

(30) Foreign Application Priority Data
Nov. 20, 2018 (JP) .............................. JP2018-217279

(51) Int. Cl.
*F21S 9/02* (2006.01)
*H01M 50/555* (2021.01)
*F21V 3/02* (2006.01)

(52) U.S. Cl.
CPC .................. *F21S 9/02* (2013.01); *F21V 3/02* (2013.01); *H01M 50/555* (2021.01)

(58) Field of Classification Search
CPC ... F21S 9/02; Y02E 60/10; H01M 2300/0002; H01M 2300/0025; H01M 50/176;
(Continued)

(56) References Cited

U.S. PATENT DOCUMENTS 4,162,814 A * 7/1979 Garbero .................... F21S 9/02
                                                                    312/114
5,900,715 A * 5/1999 Roberts ................. H01M 10/46
                                                                    320/115
(Continued)

FOREIGN PATENT DOCUMENTS

JP      2005-322608 A      11/2005

OTHER PUBLICATIONS

Pendant Lighting Frasco (glass), Literature, Oct. 1, 2010, https://platz.hamazo.tv/e2647349.html, pp. 1-5.

*Primary Examiner* — Jong-Suk (James) Lee
*Assistant Examiner* — James M Endo
(74) *Attorney, Agent, or Firm* — Workman Nydegger (57) ABSTRACT

To improve design of a lighting device. A lighting device includes optically transparent glass plates provided on side faces and placed on an optical path of light emitted from a light source, where some or all of the optically transparent glass plates contain an optically transparent battery adapted to drive the light source; and an optically transparent glass plate that contains a transparent conductive film by being provided on a bottom face, wherein the optically transparent battery is placed in contact with a pair of transparent conductive film layers, which are connected to the light source. The pair of transparent conductive film layers are formed in a pair of parallel linear grooves formed in a surface of the optically transparent glass plate on the bottom (Continued)

face, and a tabular positive tab and negative tab of the optically transparent battery fit in respective ones of the pair of grooves.

15 Claims, 4 Drawing Sheets

(58) Field of Classification Search
CPC ..... H01M 50/247; H01M 50/251; F21V 3/02; F21V 3/061
See application file for complete search history.

(56) References Cited

U.S. PATENT DOCUMENTS

| | | | | |
|---|---|---|---|---|
| 6,045,725 | A * | 4/2000 | Udaka | G02B 5/24 252/582 |
| 6,953,260 | B1 * | 10/2005 | Allen | F21L 4/027 362/194 |
| 2004/0212987 | A1 * | 10/2004 | Lu | B43K 23/001 362/101 |
| 2006/0146525 | A1 * | 7/2006 | Chernick | A63H 33/18 362/196 |
| 2008/0144310 | A1 * | 6/2008 | Barbeau | F21V 15/01 362/183 |
| 2013/0022868 | A1 * | 1/2013 | Yang | H01M 4/72 429/217 |
| 2014/0003038 | A1 | 1/2014 | Kim et al. | |
| 2014/0255791 | A1 * | 9/2014 | Miao | H01M 4/139 429/303 |
| 2015/0277498 | A1 * | 10/2015 | Wu | H01M 10/00 345/173 |
| 2015/0287899 | A1 * | 10/2015 | Navabi | F21V 33/006 362/145 |
| 2016/0126511 | A1 * | 5/2016 | Park | H01M 50/103 429/7 |
| 2016/0205753 | A1 * | 7/2016 | McCavit | H05B 47/16 315/158 |
| 2016/0327240 | A1 * | 11/2016 | Goujon | F21V 3/0615 |
| 2017/0027361 | A1 * | 2/2017 | Santiago | F21V 7/045 |

* cited by examiner

LIGHTING DEVICE

TECHNICAL FIELD

The present invention relates to a technique for a lighting device suitable for decorative use.

BACKGROUND ART

Lighting devices whose light source is covered with a glass frame are often sold for decorative use because of their stylish and simple designs. They are sold, for example, as ceiling lights, table lights, and footlights. Such lighting devices are designed to create a unique atmosphere when light from the light source in the frame strikes the entire glass around the light source. To take full advantage of this feature without spoiling atmosphere or view, it is considered desirable that the entire area of the frame around the light source is made of optically transparent glass.

CITATION LIST

Non-Patent Literature

Non-Patent Literature 1: "Pendant lamp, frasco[glass]" found online at https://platz.hamazo.tv/e2647349.html on Oct. 16, 2018

SUMMARY OF THE INVENTION

Technical Problem

However, conventional lighting devices generally does not have a built-in power supply and are structured to connect to an external power supply using a power cable, and thus have a problem with design in that the power supply comes into sight (Non-Patent Literature 1). Although there are self-powered lighting devices, part of the lighting device, such as a battery space, has to be concealed, which presents a similar problem with design.

The present invention has been made in view of the above circumstances and has an object to improve design of a lighting device.

Means for Solving the Problem

A lighting device according to the present invention comprises an optically transparent lamp frame that is placed on an optical path of light emitted from a light source and contains an optically transparent battery in part or all of the lamp frame, where the battery drives the light source.

The lighting device further comprises a conductive film-coated lamp frame including a transparent conductive film, wherein the optically transparent battery is placed in contact with the transparent conductive film, and the transparent conductive film is connected to the light source.

In the lighting device, the transparent conductive film is formed in a pair of linear grooves formed in parallel in a surface of the conductive film-coated lamp frame; and the optically transparent battery has a tabular shape and a tabular positive terminal and a tabular negative terminal protrude from a same side of the optically transparent battery and fit in respective ones of the pair of grooves.

In the lighting device, the transparent conductive film is formed in a pair of grooves formed in parallel in a surface of the conductive film-coated lamp frame, the pair of grooves drawing n-sided polygons (n is an integer equal to or larger than 3); and there are n optically transparent batteries, each of which has a tabular shape, and a tabular positive terminal and a tabular negative terminal protrude from a same side of each of the optically transparent batteries and fit in respective ones of the pair of grooves, forming an n-sided polygonal prism.

In the lighting device, of the n optically transparent batteries, all positive terminals are fitted in one of the pair of grooves and all negative terminals are fitted in another one of the pair of grooves, or the positive terminals and the negative terminals alternate grooves to fit in.

In the lighting device, there are n optically transparent batteries (n is an integer equal to or larger than 3), which make up side faces of the lighting device; and the conductive film-coated lamp frame is an n-sided polygon, making up a bottom face of the lighting device.

In the lighting device, the optically transparent lamp frame is made of glass.

Effects of the Invention

The present invention can improve design of the lighting device

BRIEF DESCRIPTION OF DRAWINGS

FIGS. 1(*a*) and 1(*b*) are diagrams showing a structure example of a lighting device (quadrangular prism).

FIGS. 2 (*a*) and 2 (*b*) are diagrams showing a structure example of a bottom face.

FIGS. 5(*a*) to 5(*c*) are diagrams showing a structure example of a lighting device (n-sided polygonal prism).

DESCRIPTION OF EMBODIMENT

The present invention is characterized by including optically transparent batteries in an optically transparent lamp frame making up side faces of a lighting device. The optically transparent batteries are used to drive a light source and included in the optically transparent lamp frame, eliminating the need for a space used to house dry batteries and the like and making it possible to keep a power supply portion out of sight. This makes it possible to provide a lighting device with improved design.

In a present embodiment, it is assumed hereinafter that an optically transparent lamp frame making up a bottom face of a lighting device is quadrangular. Note that according to the present embodiment, all optically transparent lamp frames making up the lighting device are made of optically transparent glass, and are thus called optically transparent glass plates. Note that the present invention is not limited to contents of the embodiment and example described below, and can be implemented in modified forms as appropriate without departing from the spirit and scope of the invention.

Figure 1A:
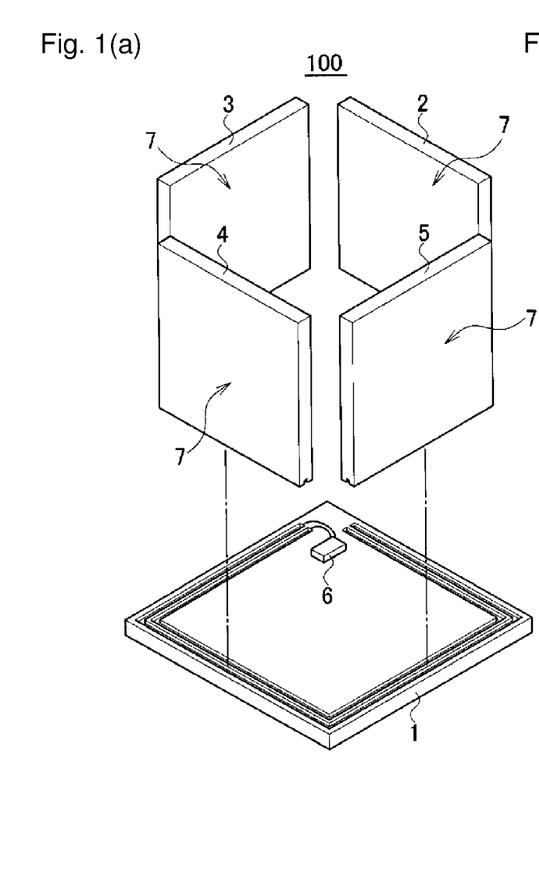
Figure 1B:
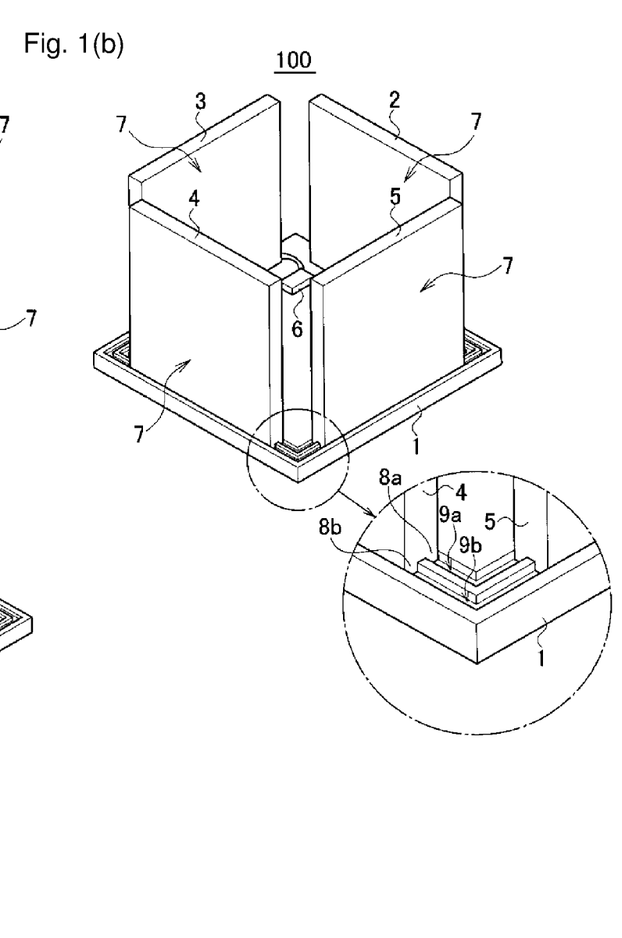
Figures 2A, 2B:
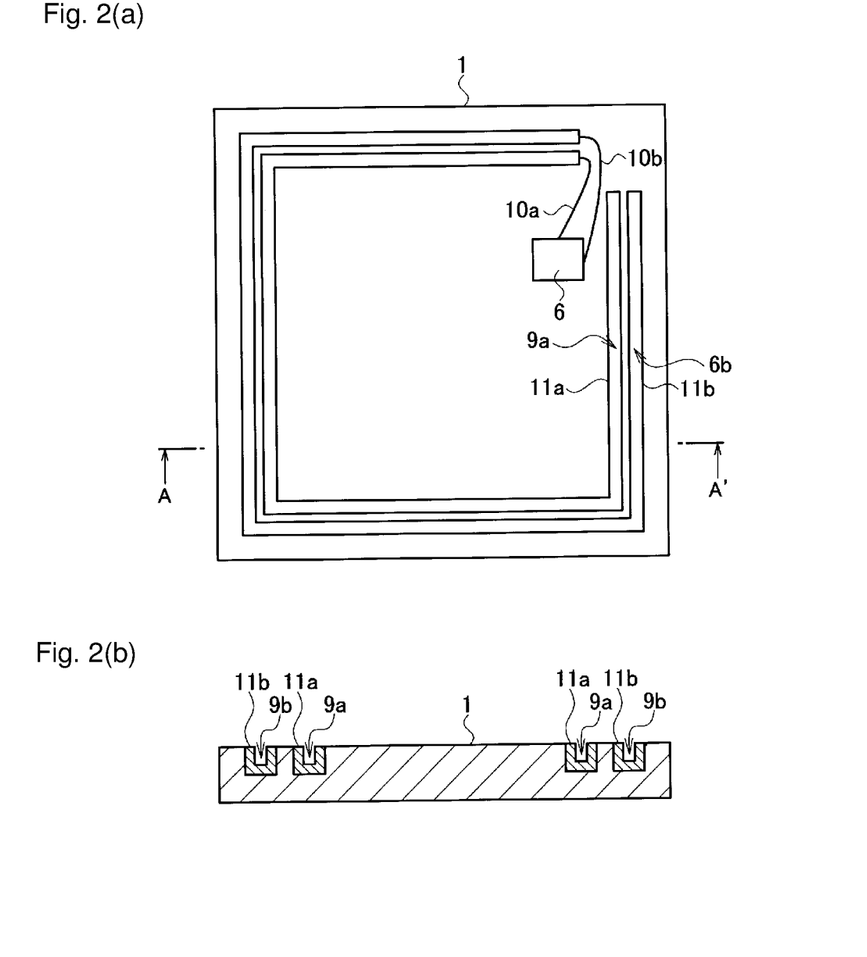

FIGS. 1 (*a*) and 1 (*b*) are diagrams showing a structure example of a lighting device 100 according to the present embodiment. FIG. 1(*a*) is an exploded view and FIG. 1(*b*) is an assembly drawing. FIGS. 2(*a*) and 2 (*b*) are diagrams showing an optically transparent glass plate on a bottom face. FIG. 2(*a*) is a top plan view and FIG. 2(*b*) is a sectional view taken along line A-A'.

As shown in FIGS. 1 (*a*) and 1 (*b*), the lighting device 100 mainly includes an optically transparent glass plate 1 making up a bottom face, four optically transparent glass plates 2 to 5 making up side faces, and a light source 6.

The four optically transparent glass plates (optically transparent lamp frames) 2 to 5 on the side faces are placed on an optical path of light emitted from the light source 6 on the bottom face, and contain optically transparent batteries 7 in part or all of themselves, where the optically transparent batteries 7 drive the light source 6. The optically transparent batteries 7 may be included in respective ones of all the optically transparent glass plates 2 to 5 or in any of the optically transparent glass plates 2 to 5.

Each of the optically transparent glass plates 2 to 5 and optically transparent batteries 7 on the side faces has a tabular shape. Each of the optically transparent glass plates 2 to 5 includes a tabular tab 8a and tabular tab 8b, which protrude from the same side of the optically transparent glass plate and thereby fit in respective ones of a pair of grooves 9a and 9b formed in the optically transparent glass plate 1 on the bottom face. When the optically transparent batteries 7 are contained in the optically transparent glass plates 2 to 5 on the side faces, the tabs 8a and tabs 8b are structured and configured as positive tabs 8a and negative tabs 8b, respectively, and the positive tabs 8a and negative tabs 8b fit in the grooves 9a and 9b, respectively.

As shown in FIGS. 2(a) and 2(b), the optically transparent glass plate (conductive film-coated lamp frame) 1 on the bottom face has a tabular shape, and includes a first transparent conductive film layer 11a and a second transparent conductive film layer 11b connected to the light source 6 via respective ones of two wires 10a and 10b. The first transparent conductive film layer 11a and second transparent conductive film layer 11b are formed in a pair of parallel linear grooves 9a and 9b formed into quadrangles in a surface of the optically transparent glass plate 1. Note that unlike the optically transparent glass plates 2 to 5 on the side faces, the optically transparent glass plate 1 on the bottom face does not always need to have optical transparency depending on design. The term "conductive film-coated lamp frame" used in the appended claims includes both the case where optical transparency is provided, and the case where optical transparency is not provided.

The lighting device 100 will be described more specifically below.

At least one of the four optically transparent glass plates 2 to 5 on the side faces is an optically transparent battery 7 provided with the positive tab 8a and negative tab 8b. The positive tab 8a and negative tab 8b support themselves by being inserted, respectively, into the groove 9a provided with the first transparent conductive film layer 11a and the groove 9b provided with the second transparent conductive film layer 11b, where the grooves 9a and 9b are provided in the optically transparent glass plate 1 on the bottom face. Then, by coming into contact with the first and second transparent conductive film layers 11a and 11b upon insertion, the positive tab 8a and negative tab 8b become electrically continuous with a positive terminal and negative terminal of the light source 6, respectively, via the first transparent conductive film layer 11a and second transparent conductive film layer 11b and further via the two wires 10a and 10b. Consequently, the light source 6 emit light by drawing power from the optically transparent battery 7.

When at least two or more of the four optically transparent glass plates 2 to 5 on the side faces are optically transparent batteries 7, the respective positive tabs 8a and negative tabs 8b are inserted into the grooves 9a provided with the first transparent conductive film layer 11a and the grooves 9b provided with the second transparent conductive film layer 11b, in the optically transparent glass plate 1 on the bottom face. Then, as all the positive tabs 8a are fitted in one of the grooves and all the negative tabs 8b are fitted in the other groove, the two or more optically transparent batteries 7 are connected in parallel. This makes it possible to increase battery capacity. Also, if the positive tabs 8a and negative tabs 8b of the optically transparent batteries 7 are inserted by alternating the inward/outward orientation of the optically transparent batteries 7 such that the positive tabs 8a and negative tabs 8b will alternately change the grooves to fit, in plural optically transparent batteries 7 can be connected in series.

When only one of the four optically transparent glass plates 2 to 5 on the side faces is an optically transparent battery 7, glass plates processed into the same shape as the optically transparent battery 7 are used as the remaining three optically transparent glass plates.

The material of the optically transparent glass plates 1 to 5 is not limited to a specific material and it is sufficient if the material is transparent to light. For example, a transparent glass substrate or transparent acrylic substrate can be used. The grooves 9a and 9b in which the first transparent conductive film layer 11a and second transparent conductive film layer 11b are provided, respectively, can be obtained by means of grooving using a typical processing machine. Respective widths of the grooves 9a and 9b can be formed such as to correspond to respective thicknesses of the positive tab 8a and negative tab 8b of the optically transparent battery 7. The first transparent conductive film layer 11a and second transparent conductive film layer 11b can be formed using a sputtering method or evaporation method by applying masking tape to surface regions excluding the grooves 9a and 9b. Available types of transparent conductive film include semiconductors such as tin-doped indium oxide (ITO), tin oxide (TO), fluorine-doped tin oxide (FTO), and zinc oxide (ZnO). Desirably sheet resistance of the transparent conductive film is 100 $\Omega$/sq or less. Furthermore, when optical transparency is considered, a 200 to 500-nm thick ITO film formed by the sputtering method is desirable.

Figure 3:
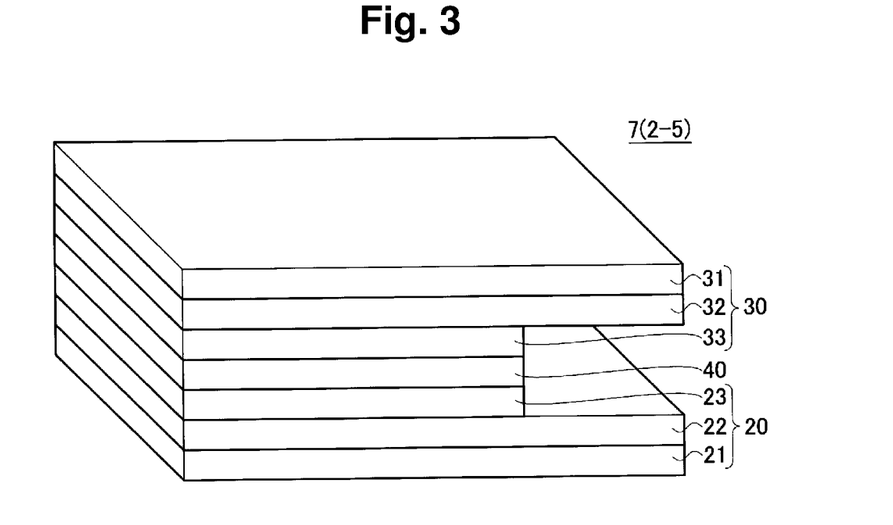
FIG. 3 is a diagram showing a structure example of an optically transparent battery.

Next, the optically transparent batteries 7 making up the optically transparent glass plates 2 to 5 on the side faces will be described with reference to FIG. 3. Each optically transparent battery 7 includes at least a positive electrode 20 made up of a transparent conductive film layer 22 and positive electrode layer 23 laminated to a glass substrate 21, a negative electrode 30 made up of a transparent conductive film layer 32 and negative electrode layer 33 laminated to a glass substrate 31, and an electrolyte layer 40. In the present embodiment, description will be given by taking as an example a battery that operates on the principle of a lithium-ion secondary battery.

The positive electrode layer 23 and negative electrode layer 33 contains a substance that allows insertion and desorption of lithium ions. The electrolyte layer 40 has lithium ion conductivity. The positive electrode layer 23 and negative electrode layer 33 are placed facing each other via the electrolyte layer 40 so as not to contact each other. When the electrolyte layer 40 is a liquid, an electrolyte is sealed by an insulating adhesive with high transparency such that the electrolyte will contact the positive electrode layer 23 and negative electrode layer 33. As the insulating adhesive, a room-temperature-curing synthetic adhesive such as a volatile-solvent type, moisture-curing type, two-component type, and UV-curing type is desirable. To ensure transparency after curing, a silicon resin adhesive or epoxy resin adhesive is desirable. Of the two types, the epoxy resin type, which has high adhesive strength and airtightness, low oxygen and water permeability, and high resistance to various chemical substances, is desirable. In particular, for an organic electrolytic solution, the epoxy resin type, which has high durability, is desirable.

Regarding the glass substrates 21 and 31, the material and thickness are not specifically limited as long as the material has optical transparency.

The transparent conductive film layers 22 and 32 can be obtained by forming transparent conductive films on the glass substrates 21 and 31 by a sputtering method, evaporation method, or spin coating method. Available types of transparent conductive film include semiconductors such as tin-doped indium oxide (ITO), tin oxide (TO), fluorine-doped tin oxide (FTO), and zinc oxide (ZnO). Desirably sheet resistance of the transparent conductive films is 100 $\Omega$/sq or less, and film thicknesses need to be in a range of 100 to 500 nm. Also, when optical transparency is considered, 100 to 200-nm thick ITO films formed by the sputtering method are desirable.

The positive electrode layer 23 and negative electrode layer 33 can be obtained by forming a material that allows insertion and desorption of lithium ions on the transparent conductive films 22 and 32 using a sputtering method, evaporation method, or spin coating method. When optical transparency is considered, it is desirable that the film thicknesses are small, but desirably the positive electrode layer 23 and negative electrode layer 33 are formed by the sputtering method in a range of 100 to 500 nm in which charge-discharge capacities are available.

An oxide such as lithium cobalt oxide ($LiCoO_2$), lithium manganese oxide ($LiMn_2O_4$), lithium iron phosphate ($LiFePO_4$), or lithium nickel oxide ($LiNiO_2$) can be used for the positive electrode layer 23.

An oxide such as lithium titanate ($LoTi_2O_4$, $Li_4Ti_5O_{12}$), titanium oxide ($TiO_2$), zinc oxide (ZnO), tin oxide (TO), indium oxide ($In_2O_3$), tin-doped indium oxide (ITO), or fluorine-doped tin oxide (FTO) can be used for the negative electrode layer 33. A combination that will make the negative electrode layer 33 lower in electrode potential than the positive electrode layer 23 can be selected.

An organic electrolytic solution or aqueous electrolytic solution having transparency and prepared by dissolving a metal salt containing lithium ions can be used for the electrolyte layer 40, where examples of the metal salt containing lithium ions include lithium bis(trifluoromethane sulfonyl) imide (LiTFSI), lithium perchlorate ($LiClO_4$), and lithium hexafluorophosphate ($LiPF_6$).

Organic solvents available for use include single solvents such as dimethylsulfoxide (DMSO), tetraethylene glycol dimethyl ether (TEGDME), dimethyl carbonate (DMC), methyl ethyl carbonate (MEC), methyl propyl carbonate (MPC), methyl isopropyl carbonate (MIPC), methyl butyl carbonate (MBC), diethyl carbonate (DEC), ethyl propyl carbonate (EPC), ethyl isopropyl carbonate (EIPC), ethyl butyl carbonate (EBC), dipropyl carbonate (DPC), diisopropyl carbonate (DIPC), dibutyl carbonate (DBC), ethylene carbonate (EC), propylene carbonate (PC), and 1,2-butylene carbonate (1, 2-BC); a mixed solvent of ethylene carbonate (EC) and dimethyl carbonate (DMC) (1:1 volume ratio), a mixed solvent of EC and diethyl carbonate (DEC), and other mixed solvents.

Examples of the aqueous electrolytic solution include an aqueous solution prepared by dissolving a metal salt containing sodium ions of $LiClO_4$ in water and a lithium-ion-conducting liquid (hydrate melt) prepared by mixing a lithium salt such as LiTFSI or lithium bis(pentafluoroethane sulfonyl) imide (LiBETI) in an extremely small quantity of water. Also, conventional solid electrolytes containing lithium ions as well as solid-state electrolytes such as polymer electrolytes are available for use as long as the electrolytes are transparent to visible light.

Now, an example will be described below by assuming that the quadrangular optically transparent glass plate 1 is used for the bottom face and that each of the optically transparent glass plates 2 to 5 on the side faces contain the quadrangular optically transparent battery 7. Note that the optically transparent battery 7 uses lithium cobalt oxide ($LiCoO_2$) as the positive electrode layer 23, lithium titanate ($Li_4Ti_5O_{12}$) as the negative electrode layer 33, and lithium bis(trifluoromethane sulfonyl) imide (LiTFSI) dissolved in methyl propyl carbonate (PC), as the electrolyte layer 40.

EXAMPLE (First Step: Producing the Optically Transparent Glass Plate 1 on the Bottom Face)

Figure 4:
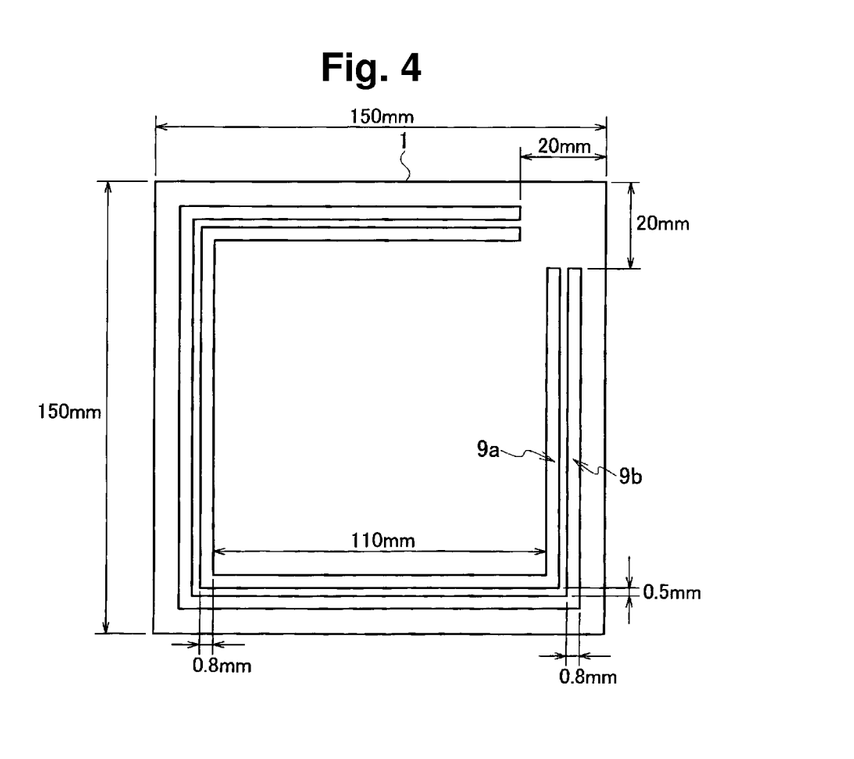
FIG. 4 is a diagram showing sizes of optically transparent glass on the bottom face.

First, the optically transparent glass plate 1 on the bottom face such as shown in FIGS. 2(a) and 2(b) was produced. A glass plate measuring 150 mm long, 150 mm wide, and 20 mm thick was used as a glass substrate as shown in FIG. 4. In the surface of the glass substrate, a pair of parallel linear grooves 9a and 9b were formed into quadrangles measuring approximately 110 mm on each side. In so doing, assuming that the wires 10a and 10b were going to be connected to the grooves 9a and 9b at the same end, opposite ends of the grooves 9a and 9b were placed 20 mm apart from one corner of the glass substrate. Both the grooves 9a and 9b were 0.8 mm wide and 10 mm deep, and the groove spacing was 0.5 mm.

Then, the masking tape was affixed to the surface excluding the grooves 9a and 9b thus formed and an ITO target was formed on the glass substrate by the sputtering method, thereby forming 300-nm thick ITO layers on the side faces and bottom face inside the grooves.

A typical 5-mm LED lamp (super high intensity 5-mm red LED OS5RKA5111P) was used as the light source 6 and a positive terminal and negative terminal were connected to the ITO layers formed, respectively, in the grooves 9a and 9b of the optically transparent glass plate 1. The positive terminal was connected to the inner groove and the negative terminal was connected to the outer groove.

(Second Step: Producing the Optically Transparent Batteries (Optically Transparent Glass Plates 2 to 5) on the Side Faces)

Next, two glass plates measuring 100 mm long, 100 mm wide, and 0.7 mm thick were prepared on a glass substrate. ITO targets were formed as the transparent conductive film layers 22 and 32 on the whole surfaces on respective sides by the sputtering method. The film thicknesses were 200 nm. The positive electrode layer 23 and negative electrode layer 33 were formed on part of the surfaces of the ITO layers by the sputtering method. The film thickness of each electrode layer was 100 nm. Of the 100 mm×100 mm surface region of each ITO layer, a 100 mm×10 mm region on an edge was masked and the positive electrode layer 23 or negative electrode layer 33 was formed on the remaining 100 mm×90 mm surface region of the ITO layer. In this way, the ITO layer was partially exposed as a positive tab or negative tab.

The positive electrode layer 23 and negative electrode layer 33 were formed by sputtering a $LiCoO_2$ target and $Li_4Ti_5O_{12}$ target, respectively. The average transmittances of the resulting positive electrode ($LiCoO_2$/ITO/glass) and negative electrode ($Li_4Ti_5O_{12}$/ITO/glass) in the visible light region were 30% and 80%, respectively.

Then, perimeters of the surface regions in which the positive electrode layer 23 and negative electrode layer 33 had been formed were bonded together by an insulating adhesive such that the positive electrode layer 23 and negative electrode layer 33 will face each other at a distance of 0.5 mm. In so doing, part (approximately 10 mm) of the perimeters were not bonded to provide an electrolyte inlet. As the adhesive, a two-component, room-temperature-curing, epoxy resin adhesive was used. It was confirmed that the adhesive cured approximately 60 minutes after the two components were mixed and the color after cure was translucent light yellow.

Subsequently, 1 mol/l of a transparent LiTFSI/PC solution was poured through the electrolyte inlet as an electrolytic solution for the electrolyte layer 40, then the electrolyte inlet was sealed by an adhesive similar to the one described above, and the adhesive was allowed to cure overnight to obtain a battery. Four such batteries were created.

The average transmittance in the visible light region was 25% and it was confirmed that the batteries had optical transparency even when observed visually. The optically transparent batteries were charged up to 3 V at room temperature using a commercially available charge/discharge measuring system (SD8 Battery Charge/Discharge System made by Hokuto Denko Corp.).

(Third Step: Assembly and Lighting Operation of the Lighting Device)

Subsequently, the positive tabs and negative tabs of the four optically transparent batteries 7 created in the second step were fixed in such a way as to support themselves by being inserted into the grooves in the four sides of the quadrangular optically transparent glass plate created on the bottom face in the first step. The positive tabs were placed on the inner side and the negative tabs were placed on the outer side. As the optically transparent batteries were installed on the optically transparent glass plate, electrical continuity was established and the LED light lit up. The lighting time was approximately 1 day.

(Fourth Step: Charging the Optically Transparent Batteries)

By charging the optically transparent batteries 7 using a charge/discharge measuring system prepared separately, it was confirmed that the optically transparent batteries 7 can be used repeatedly. Various charging methods are conceivable. For example, a method is conceivable that charges the optically transparent batteries 7 (optically transparent glass plates 2 to 5 on the side faces) removed from the optically transparent glass plate 1. To charge the optically transparent batteries 7 in an assembled state, a method is conceivable that involves disconnecting the positive terminal and negative terminal of the light source 6 from the first transparent conductive film layer 11a and second transparent conductive film layer 11b and connecting a battery charger to the first transparent conductive film layer 11a and second transparent conductive film layer 11b.

As has been described above, according to the present embodiment, since part of the optically transparent glass plates 2 to 5 making up the frame of the lighting device 100 are made of the optically transparent batteries 7, the lighting device 100 can be configured such that the power supply portion will not come into sight and that the design will not be impaired.

Figure 5A:
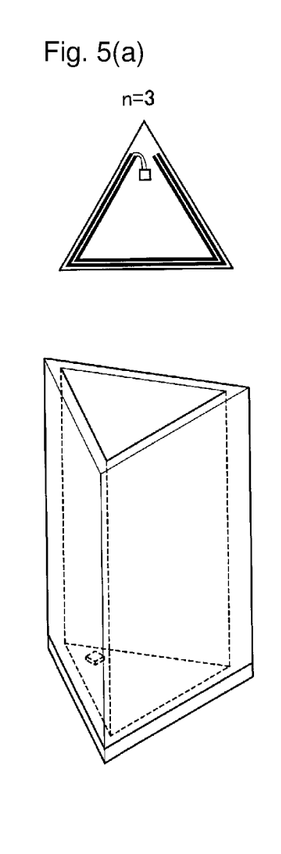
Figure 5B:
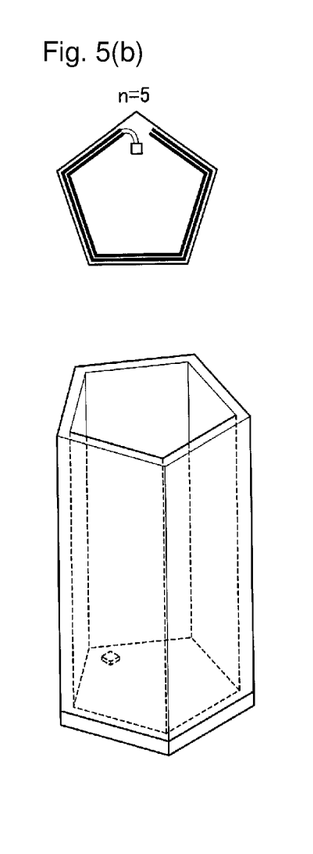
Figure 5C:
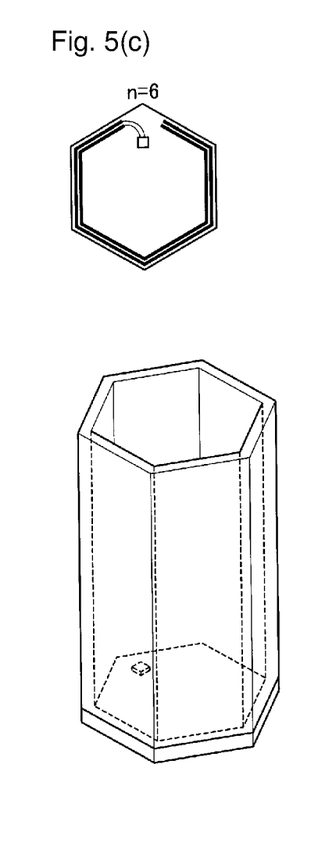

In the present embodiment and present example, description has been given of a case in which the optically transparent glass plate 1 on the bottom face is quadrangular and the lighting device 100 is a quadrangular prism. Besides, as shown in FIGS. 5(a) to 5(c), by forming the optically transparent glass plate 1 on the bottom face into an n-sided polygon (n=3, 4, 5, 6, or a larger integer) and combining the n optically transparent glass plates on the side faces with the optically transparent glass plate 1 so as to form an n-sided polygon, the lighting device 100 may be formed into an n-sided polygonal prism.

REFERENCE SIGNS LIST

100 Lighting device
1 Optically transparent glass plate on bottom face
2 to 5 Optically transparent glass plates on side faces
6 Light source
7 Optically transparent battery
8a Tab/positive tab
8b Tab/negative tab
9a, 9b Groove
10a, 10b Wire
11a First transparent conductive film layer
11b Second transparent conductive film layer
20 Positive electrode
21 Glass substrate
22 Transparent conductive film layer
23 Positive electrode layer
30 Negative electrode
31 Glass substrate
32 Transparent conductive film layer
33 Negative electrode layer
40 Electrolyte layer

The invention claimed is:
1. A lighting device comprising;
an optically transparent lamp frame that is placed on an optical path of light emitted from a light source; and
an optically transparent battery contained in part or all of the lamp frame, where the battery drives the light source,
wherein the optically transparent battery includes a first glass substrate layer, a negative electrode layer, a first transparent conductive layer disposed between the first glass substrate layer and the negative electrode layer, a second glass substrate layer, a positive electrode layer, a second transparent conductive layer disposed between the second glass substrate layer and the positive electrode layer, and an electrolyte layer disposed between the negative electrode layer and the positive electrode layer, and
wherein the electrolyte layer, the negative electrode layer, and the positive electrode layer form a notch in the optical transparent battery.

2. The lighting device according to claim 1, further comprising a conductive film-coated lamp frame including a transparent conductive film, wherein
the optically transparent battery is placed in contact with the transparent conductive film, and the transparent conductive film is connected to the light source.

3. The lighting device according to claim 2, wherein:
the transparent conductive film is formed in a pair of linear grooves formed in parallel in a surface of the conductive film-coated lamp frame; and
the optically transparent battery has a tabular shape and a tabular positive terminal and a tabular negative terminal protrude from a same side of the optically transparent battery and fit in respective ones of the pair of grooves.

4. The lighting device according to claim 3, wherein there are n optically transparent batteries (n is an integer equal to or larger than 3), which make up side faces of the lighting device; and the conductive film-coated lamp frame is an n-sided polygon, making up a bottom face of the lighting device.

5. The lighting device according to claim 3, wherein the optically transparent lamp frame is made of glass.

6. The lighting device according to claim 2, wherein:
the transparent conductive film is formed in a pair of grooves formed in parallel in a surface of the conductive film-coated lamp frame, the pair of grooves drawing n-sided polygons (n is an integer equal to or larger than 3); and
there are n optically transparent batteries, each of which has a tabular shape, and a tabular positive terminal and a tabular negative terminal protrude from a same side of each of the optically transparent batteries, and fit in respective ones of the pair of grooves, forming an n-sided polygonal prism.

7. The lighting device according to claim 6, wherein of the n optically transparent batteries, all positive terminals are fitted in one of the pair of grooves and all negative terminals are fitted in another one of the pair of grooves, or the positive terminals and the negative terminals alternate grooves to fit in.

8. The lighting device according to claim 7, wherein there are n optically transparent batteries (n is an integer equal to or larger than 3), which make up side faces of the lighting device; and the conductive film-coated lamp frame is an n-sided polygon, making up a bottom face of the lighting device.

9. The lighting device according to claim 7, wherein the optically transparent lamp frame is made of glass.

10. The lighting device according to claim 6, wherein there are n optically transparent batteries (n is an integer equal to or larger than 3), which make up side faces of the lighting device; and the conductive film-coated lamp frame is an n-sided polygon, making up a bottom face of the lighting device.

11. The lighting device according to claim 6, wherein the optically transparent lamp frame is made of glass.

12. The lighting device according to claim 2, wherein there are n optically transparent batteries (n is an integer equal to or larger than 3), which make up side faces of the lighting device; and the conductive film-coated lamp frame is an n-sided polygon, making up a bottom face of the lighting device.

13. The lighting device according to claim 12, wherein the optically transparent lamp frame is made of glass.

14. The lighting device according to claim 2, wherein the optically transparent lamp frame is made of glass.

15. The lighting device according to claim 1, wherein the optically transparent lamp frame is made of glass.

* * * * *